United States Patent [19]

Wold et al.

[11] Patent Number: 4,631,266
[45] Date of Patent: Dec. 23, 1986

[54] CATALYST FOR CONVERSION OF METHANOL

[75] Inventors: Johnny Wold; Leif A. Kristiansen, both of Porsgrunn, Norway

[73] Assignee: Norsk Hydro a.s, Oslo, Norway

[21] Appl. No.: 794,924

[22] PCT Filed: Mar. 12, 1985

[86] PCT No.: PCT/NO85/00016

§ 371 Date: Oct. 10, 1985

§ 102(e) Date: Oct. 10, 1985

[87] PCT Pub. No.: WO85/04597

PCT Pub. Date: Oct. 24, 1985

[30] Foreign Application Priority Data

Apr. 12, 1984 [NO] Norway .................................. 841453

[51] Int. Cl.⁴ .................... B01J 21/04; B01J 23/02; B01J 23/34; B01J 23/72

[52] U.S. Cl. .................... 502/324; 502/346; 502/524; 423/648 R

[58] Field of Search .................... 502/324, 346, 524; 423/648 R

[56] References Cited

U.S. PATENT DOCUMENTS 3,787,332 1/1974 Sugier .................... 502/346 X
4,308,176 12/1981 Kristiansen .................... 502/342

FOREIGN PATENT DOCUMENTS 1439172 6/1976 United Kingdom .

OTHER PUBLICATIONS

Barber et al., "Studies of the Surface Behavior of Oxide Catalysts by Secondary Ion Mass Spectrometry", J. of Catalysis 41, pp. 240-248 (1976).

*Primary Examiner*—W. J. Shine
*Attorney, Agent, or Firm*—Wenderoth, Lind & Ponack

[57] ABSTRACT

The invention relates to a catalyst and application of this catalyst for decomposing methanol to carbon monoxide and hydrogen in order to obtain a hydrogen-rich gas for fuel purposes. The catalyst comprises aluminium oxide and copper oxide and at least 60% of the copper present in the catalyst is bound to aluminium oxide as copper oxide-aluminium oxide spinel. The catalyst contains alkali or alkaline earth oxide which is present in the pores of the spinel in an amount of 0.2-12% by weight calculated as metal, and the catalyst contains 0-10% by weight of manganese. The metal oxide in the pores of the spinel is preferably potassium oxide in amounts of 4-8% by weight calculated as potassium metal.

4 Claims, 3 Drawing Figures

CATALYST FOR CONVERSION OF METHANOL

BACKGROUND OF THE INVENTION

The present invention relates to a catalyst, primarily for decomposing methanol to carbon monoxide and hydrogen. The invention also relates to application of this catalyst for decomposing methanol.

Catalytic decomposition of methanol for obtaining a hydrogen-rich gas has become of special interest in connection with use of methanol as a fuel for internal combustion engines and combustion turbines. Further, decomposition of methanol for the production of very pure hydrogen for hydrogen consuming processes is an alternative for conventional hydrogen producing processes.

U.S. Pat. No. 4,185,456 describes a method for the use of at least partly decomposed methanol as a fuel for combustion turbines. The heat of vaporization and decomposition of methanol is taken from the exhaust gas from the combustion. As stated in that patent, superheating and dissociating methanol to carbon monoxide and hydrogen, increases the energy content of approximately 20%. For combustion turbines, the energy content in the exhaust gas is more than enough to superheat the methanol and dissociate it. The method makes it possible both to supply the power for the turbine and to produce a valuable process gas containing hydrogen and carbon monoxide. The catalyst for the dissociation of methanol is selected from catalysts for the reverse reaction of forming methanol from carbon monoxide and hydrogen.

Application of dissociated methanol for internal combustion engines is described in a paper by J. Finegold et al. presented at the 1982 World Hydrogen Energy Conference IV, Pasadena, Calif., USA. The concept was demonstrated by mounting a reactor into the engine compartment of a 1980 Chevrolet Citation such that the system could be road-tested. The catalyst used was a copper-zinc oxide catalyst supported on alumina pellets. The heat for vaporizing methanol was taken from the engine coolant, while the heat for dissociating methanol was taken from the exhaust gas. A substantial improvement of brake thermal efficiency compared to gasoline systems was demonstrated. At low load the exhaust temperature and heat content was not sufficient to complete dissociation of all the methanol with the catalyst used. This means that some of the chemical energy gain is lost, but sufficient dissociation to gain the advantages due to lean burning was always obtained.

It is well known that catalysts based on copper and zinc oxide are active for synthesis of methanol from carbon monoxide and hydrogen. In addition these catalysts contain a trivalent metal oxide such as chromium or aluminium oxide. Such catalysts are described in DE Nos. 28 46 614 and 30 46 840. Generally speaking, catalytic decomposition of methanol can be achieved with the same type of catalyst as the synthesis of methanol. These catalysts are also active for steamreforming of methanol. However, the drawback for most of the copper-zinc-oxide catalysts is that they tend to be mechanically weak, and the mechanical properties of the catalyst are very important when it is to be used in a vehicle. Thus a conventional methanol synthesis catalyst would hardly be suitable in vehicles.

Another problem in catalytic decomposition of methanol is that several competing reactions may take place, and not all of these reactions are desired. Thus it is most important that the catalysts has a high selectivity for the most desired reaction. The following reactions may take place:

1. $CH_3OH \rightleftharpoons CO + 2H_2$

2. $CO + 3H_2 \rightleftharpoons CH_4 + H_2O$

3. $CO + H_2O \rightleftharpoons H_2 + CO_2$

4. $CH_3OH + H_2O \rightleftharpoons 3H_2 + CO_2$

5. $2CH_3OH \rightleftharpoons CH_3OCH_3 + H_2O$

The catalyst should be most selective for reaction No. 1. When methanol dehydrates to form dimethyl ether (DME) and water, reaction No. 5, the energy content is increased considerably less than when methanol decomposes according to reaction No. 1. Thus reaction No. 5 is indeed undesired when methanol is used for fuel purposes. Reactions 2 and 3 occur to a very low extent for catalysts containing copper. Reactions 3 and 4 will only occur if reaction 5 takes place.

SUMMARY OF THE INVENTION

These objects are accomplished by a catalyst which comprises aluminium oxide and copper oxide, and at least 60% by weight of this oxide mixture consists of a copper-alumina spinel. 60–100% of the copper present in the catalyst is bound to aluminium oxide as copper oxide-aluminium oxide spinel. The pores of the spinel contain an alkali or alkaline earth oxide.

DETAILED DESCRIPTION OF THE INVENTION

Figure 1:
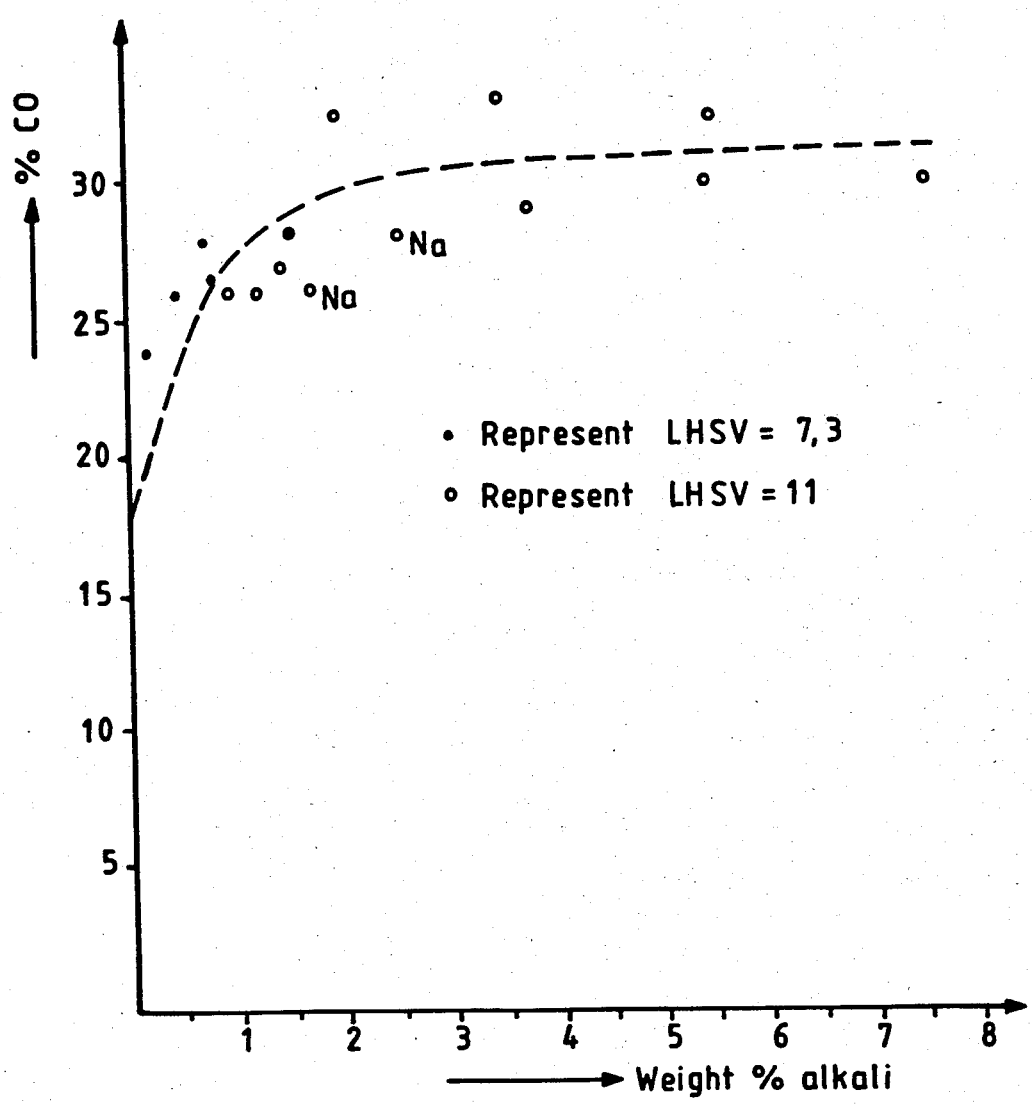
FIG. 1 shows the relation between the amount of potassium in a catalyst and the selectivity for methanol decomposition.

The object of the invention was to develop a new catalyst, primarily for methanol decomposition. The catalyst should have high activity for decomposition of methanol at low temperature and negligible activity for dehydration of methanol. It should also have high mechanical strength.

Another object was to obtain an improved process for producing hydrogen-rich gas by decomposing methanol.

As previously stated, it is most important for catalysts to be used in vehicles that the mechanical properties are excellent. A mechanically strong catalyst is described in U.S. Pat. No. 4,308,176. This catalyst comprises copper-alumina spinel containing zinc oxide. In the unreduced state, copper is bound to alumina to form copper-alumina spinel with an inverse spinel structure. The catalyst is prepared from an aqueous mixture of copper and aluminium nitrate to which ammonium or sodium carbonate is added in order to precipitate the copper and aluminium oxides. Before calcining the precipitate to obtain the copper-alumina spinel, the precipitate is washed with water to remove the nitrate salt. If sodium salt is used as precipitant, the amount of water must be sufficient to bring the sodium level in the dried product below 0.2%. If the sodium level in the product is higher, the copper-alumina spinel formation during the calcination step will be difficult, resulting in formation of large crystallites of CuO, which again results in a less active catalyst. Further details regarding production of this catalyst is described in the above referred U.S. patent.

Though this catalyst was found to have lower activity for synthesis of methanol from CO and $H_2$ than copper/zinc-oxide catalysts, the inventor found it worthwhile to test the catalyst for decomposition of methanol because of its high mechanical strength.

This catalyst in the reduced state was then tested for decomposition of methanol and was surprisingly found to have very high activity for this reaction. However, the selectivity for decomposing methanol to hydrogen and carbon monoxide, reaction No. 1, was not particularly good. The CO content in the product gas was about 5% and the $CO_2$ content about 10%, and these figures indicate that reaction No. 5 took place and that methanol was dehydrated and dimethyl ether was formed.

In spite of this disappointing observation regarding selectivity, it was decided to carry on with this catalyst because of its good mechanical properties and high activity for methanol decomposition. The inventor now tried to modify the catalyst in order to improve its selectivity with respect to reaction No. 1.

As previously stated, the catalyst according to U.S. Pat. No. 4,308,176 comprises a copper-alumina spinel having zinc oxide in its pores. One way of modifying the catalyst is to substitute the zinc oxide in the pores of the spinel with other metal salts. In order to remove the dehydration activity of the catalyst, the inventor impregnated the spinel with various metal salts and then heated the impregnated spinel to convert the metal salts to the corresponding oxide. Since the dehydration reaction most probably will occur on acidic sites, it was considered that alkali or alkaline earth oxides might be most effective. However, other oxides were also tried. The content of the added oxides was in the range 1-3% by weight during these preliminary tests. It was found that the dehydration activity was reduced when the spinel was impregnated with alkali or alkaline earth oxides. But it was also found that manganese had a beneficial effect on the activity for decomposing methanol to carbon monoxide and hydrogen. From these tests it seemed that a few percent of, for instance, potassium or sodium in the catalyst would eliminate completely the dehydration reaction. Further investigations in order to obtain more detailed and quantitative information about the effect of adding alkali or alkaline earth oxides to the spinel were then carried out. These investigations fully confirmed the initial test results, and accordingly there is provided a new catalyst comprising copper-alumina spinel.

This catalyst contains 0.2-12% by weight, calculated as metal, of alkali or alkaline earth oxide in the pores of the spinel. The catalyst can also contain manganese oxide in an amount corresponding to 0-10% by weight manganese.

Preferably the catalyst comprises potassium oxide in the pores of the spinel in an amount of 4-8% by weight calculated as potassium metal.

In another preferred embodiment, the pores of the spinel contain potassium oxide, and further contain manganese oxide in an amount corresponding to 5% manganese metal.

The invention will be further explained by the examples.

EXAMPLE 1

This example describes preparation of a precursor comprising a copper-alumina spinel, and the product from this example will later on be referred to as P-1. The spinel is made as described in U.S. Pat. No. 4,308,176. An aqueous solution of copper and aluminium nitrate was prepared by dissolving 60.4 g $Cu(NO_3)_2.3H_2O$ and 187.5 g $Al(NO_3)_3.9H_2O$ per liter solution. Another aqueous solution was made by dissolving 288 g $(NH_4)_2CH_3$ per liter solution. These two solutions were pumped to a vessel at such relative rates that the pH in this vessel was kept at 6.0-6.5. The temperature was maintained at 20° C. The precipitate thereby formed was filtered off and washed with water until the ammonium nitrate content in the dried product was less than 5%, and the filtrate was dried at 80°-90° C. until a moisture content of less than 25%. Then the product was crushed to a particle size less than 0.5 mm.

A sodium salt such as $Na_2CO_3$ may replace the above mentioned ammonium salt as precipitant. In that case the precipitate must be washed with sufficient water to bring the sodium level in the dried product below 0.2%.

After drying, the precipitate was calcined at 750°-850° C. to give the copper-alumina spinel.

EXAMPLE 2

Preparation of product P-2:

This example describes preparation of a known methanol decomposition catalyst. Its utilization is described in NASA Technical paper No. 1247 by Th. A. Brabs, USA. An aqueous solution of copper and chromium nitrate was prepared by dissolving 241.6 g of $Cu(NO_3)_2.3H_2O$ and 105.3 g of $Cr(NO_3)_3.9H_2O$ per liter solution. A 1.5 molar aqueous solution of $NH_4HCO_3$ was added under vigorous stirring until the pH reached a value of 6.2 The precipitate was filtered off and washed with sufficient water to bring the ammonium nitrate content in the dried product below 5%. The product was then dried at 100° C., crushed to a particle size below 0.5 mm and calcined at 400° C. for 2 hours.

This catalyst contains about 79% by weight CuO and about 21% by weight $Cr_2O_3$.

EXAMPLE 3

This is a commercial catalyst used for the low temperature shift reaction. Its composition can be given as $(0.35\ Cu,\ 0.66\ Zn)_5(CO_3)_2(OH)_6$ as revealed by x-ray diffraction. It also contains approximately 2% alumina.

The catalysts described above were tested for the decomposition of methanol in a tubular reactor with length 320 mm and inner diameter 26 mm. 30 g of catalyst was used in each case. The catalysts were diluted with approximately 150 g of alfa-alumina to fill the reactor.

The catalysts were reduced with pure hydrogen at a pressure of 150 kPa. The hydrogen was added at room temperature, and the temperature was increased to a maximum temperature during 3 hours. The maximum temperature was 280° C. for the spinel catalyst (P-1) and 210° C. for the two other catalysts (P-2 and P-3).

The results of the tests are summarized in Table 1.

TABLE 1

| Product identity | % CO at reactor outlet | % conversion at reactor outlet |
|---|---|---|
| P-1 | 5 | 60 |
| P-2 | 30 | 55 |
| P-3 | 28 | 75 |

As can be seen from table 1, the selectivity for $CO/H_2$ formation is low for product P-1. Theoretically the content of CO in the exit gas should be 33% for 100% selectivity for the decomposition of methanol to $CO/H_2$ (reaction No. 1). Using P-1 gives only 5% CO, while P-2 gives 30% and P-3 gives 28%. In spite of the fact that P-2 and P-3 had high selectivity, their poor mechanical properties made them less suitable for use in vehicles.

The possibility of improving the product P-1's selectivity for $CO/H_2$ formation was then investigated by impregnating the product with aqueous solutions of various metal salts and calcination for decomposing the salt to the corresponding metal oxide. The tests were run at an inlet temperature of 290° C., liquid hourly space velocity (LHSV) of 11,5 $h^{-1}$ and a pressure of 120 kPa. The result of these tests are summarized in table 2.

TABLE 2

| Product identity | Impregnating solution | Calc. temp. | % CO at reactor outlet | % conv. |
|---|---|---|---|---|
| P-1/M | 0.8 $Mn(NO_3)_2$ | 350 | 6 | 95 |
| P-1/C | 0.8 $Ca(NO_3)_2$ | 350 | 15 | 70 |
| P-1/Z | 0.8 $Zn(NO_3)_2$ | 350 | 5 | 60 |
| P-1/ZM | 0.4 $Mn(NO_3)_2$ 0.4 $Zn(NO_3)_2$ | 350 | 5 | 95 |
| P-1/N | 0.8 $NaHCO_3$ | 90 | 14 | 60 |
| P-1/KM | 0.8 $KMnO_4$ | 90 | 24 | 60 |

The concentrations of the impregnating solutions are given in mol/liter.

The results show that adding alkali or alkaline earth metal oxides to P-1 improves the selectivity for $CO/H_2$ formation, and decreases the activity for the dehydration reaction.

Manganese and zinc oxide seem to have no effect on the selectivity, but manganese seems to increase the activity of the catalyst. It was further found that in some cases it will be beneficial to incorporate up to 10%, and preferably 5%, by weight of manganese in the catalyst. It also appears that potassium is most effective in preventing the dehydration reaction, although both sodium and calcium show the same effect, but not to the same extent as potassium.

The effect of potassium was further investigated by loading samples of product P-1 with different amounts of potassium and testing these products. Two versions of P-1 with different molar ratios of copper/aluminium were also prepared. The ratio used was 0.25 and 0.5. The latter corresponds to the amounts of salts given in example 1. In the preparation of the former, half the amount of copper salt was used.

Otherwise the preparation was identical with that given in example 1. In order to make sure that the product was alkali free before adding the potassium salt, ammounium carbonate was used as precipitating agent.

P-1 was impregnated with an aqueous solution of $KHCO_3$, followed by drying and calcining at 350° C. The tests of these products were run at inlet temperature: 280° C., pressure: 120 kPa, liquid hourly space velocity: 7-11 liter methanol per liter catalyst per hour. Catalyst particle size was: 0.8-2.0 mm.

Table 3 summarizes the effect of potassium.

TABLE 3

| Product identity | Molarity of $KHCO_3$ in impreg. solution | Weight % potassium in catalyst | % CO | % conv. | LHSV |
|---|---|---|---|---|---|
| P-1/0.5/0 | — | 0 | 17.7 | 50.0 | 7.3 |
| P-1/0.5/1 | 0.025 | 0.17 | 24.2 | 52.0 | 7.3 |
| P-1/0.5/2 | 0.050 | 0.35 | 26.1 | 55.0 | 7.3 |
| P-1/0.5/3 | 0.10 | 0.77 | 27.7 | 57.0 | 7.3 |
| P-1/0.5/4 | 0.20 | 1.56 | 28.3 | 54.0 | 7.3 |
| P-1/0.5/5 | 0.50 | 3.78 | 29.1 | 57.0 | 7.3 |
| P-1/0.5/6 | 1.00 | 5.47 | 32.5 | 43.0 | 10.0 |
| P-1/0.5/Na/1 | 0.50(Na) | 1.61(Na) | 26.0 | 39.0 | 10.0 |
| P-1/0.5/Na/2 | 1.00(Na) | 2.64(Na) | 28.0 | 35.2 | 10.0 |
| P-1/0.3/1 | 0.2 | 1.1 | 31.2 | 28.0 | 11.0 |
| P-1/0.3/2 | 0.5 | 3.16 | 31.2 | 30.0 | 11.0 |
| P-1/0.3/3 | 1.0 | 5.52 | 32.5 | 35.0 | 11.0 |
| P-1/0.3/4 | 1.5 | 7.68 | 29.1 | 38.0 | 11.0 |
| P-1/0.5/7 | 0.2 | 1.24 | 32.5 | 26.0 | 11.0 |
| P-1/0.5/8 | 0.5 | 2.66 | 33.0 | 30.0 | 11.0 |
| P-1/0.5/9 | 1.0 | 4.78 | 30.2 | 38.5 | 11.0 |
| P-1/0.5/10 | 1.5 | 6.80 | 30.0 | 45.0 | 11.0 |

P-1/0.5/x, where x refers to a test number, has a molar copper to aluminium ratio of 0.5, while the products P-1/0.3 have a copper to aluminium ratio of 0.3.

The products P-1/0.3/x contain 0.8% sodium in addition to the potassium content shown in table 3.

Where sodium is indicated in table 3, potassium is replaced by sodium.

In FIG. 1 a graph is given showing the relation between the amount of potassium in the catalyst and the selectivity for methanol decomposition to carbon monoxide and hydrogen in terms of percent CO in the outlet gas. The two points marked Na represent the products P-1/0.5/Na/(1 and 2), and show that sodium has almost the same effect as potassium in eliminating the dehydration reaction. The experiments were carried out as shown at LHSV=7.3 $h^{-1}$ and 11 $h^{-1}$ respectively.

Product P-1 was also prepared using sodium carbonate as the precipitating agent instead of ammonium carbonate. This product contains 0.8% sodium due to incomplete washing. Samples of this product were impregnated with $KHCO_3$ solutions, dried and calcined at 350° C. They were tested for activity and selectivity as described above. The results for these samples fit into the pattern for potassium, but indicating that sodium is slightly less effective in eliminating the dehydration reaction compared to potassium.

Figure 2:
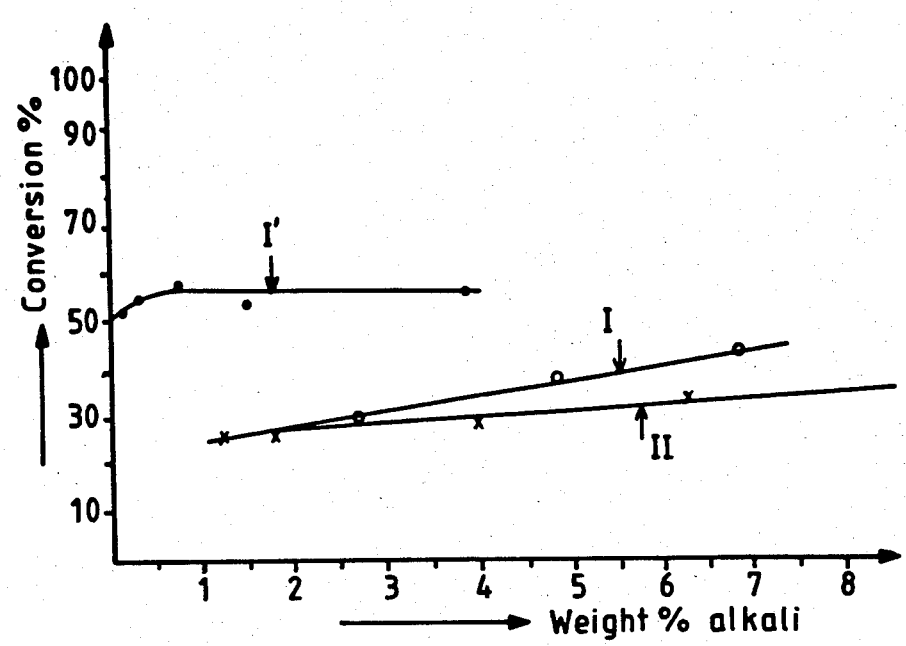
FIG. 2 shows the relation between catalyst activity and the amount of alkali in the catalyst.

In FIG. 2 a graph is given showing a relation between activity, measured as % conversion of methanol to carbon monoxide and hydrogen, and the content of alkali in the catalyst. The conversion is shown for two catalysts according to the invention. One having a ratio for Cu/Al=0.5 in the spinel (curve I and I') and the other Cu/Al=0.3 (curve II).

It is seen that the activity depends on the alkali level in the catalyst, and also on the content of copper. The results shown by curve I, I' and II refer to experiments carried out at LHSV=7.3 $h^{-1}$, 11 $h^{-1}$ and 10 $h^{-1}$ respectively.

A comparison has been made between a catalyst described in this patent application and the catalyst used by J. Finegold et al. in the road-test program described earlier in this paper. That catalyst is designated T2107RS.

The catalyst was prepared by impregnating product P-1 with KMnO$_4$ and reducing this compound with ethanol at 20° C. The end product had the following chemical composition: CuO: 38%, KOH: 3.6%, MnO: 4.5%, Al$_2$O$_3$: 53.9%, giving a molar Cu/Al ratio of 0.45. The catalysts were tested in the same way as described in Example 3, using 32 grams (43 cc) of T2107RS which showed both decomposition and dehydration activity. The CO content in the exit gas was 2% at 220° C., and increased to 27% at a temperature of 300° C. The CO content in the exit gas using the impregnated spinel catalyst was 31% independent of the temperature.

Figure 3:
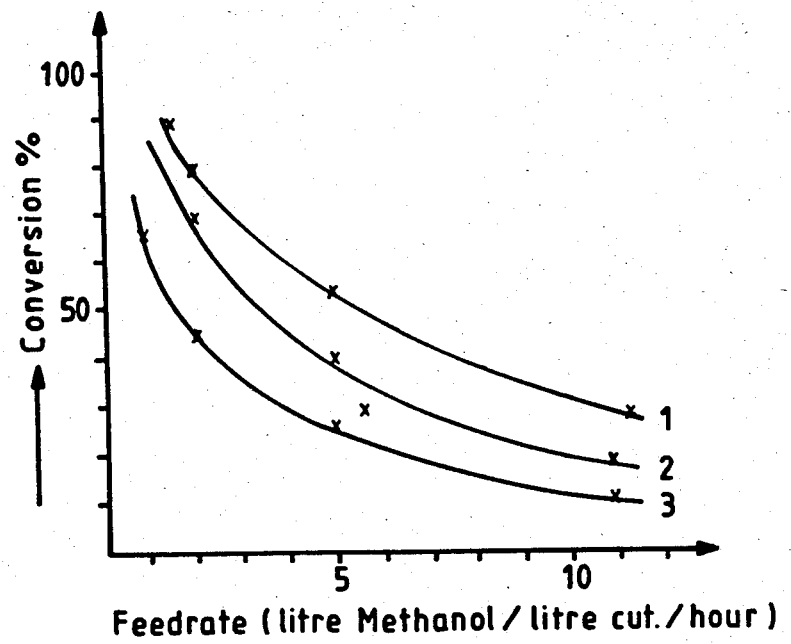
FIG. 3 shows the relation between catalyst activity and feedrate of methanol.

In FIG. 3 a graph is given showing the relation between activity measured as % conversion and feedrate, measured as liquid hourly space velocity (LHSV) for these two catalysts. Curve 1 shows the results for the catalyst according to the invention, curve 2 shows total conversion for T2107RS and curve 3 conversion to CO+2H$_2$ for T2107RS.

We claim:

1. A catalyst comprising aluminium oxide and copper oxide where at least 60% by weight of this oxide mixture consists of a copper-alumina spinel and 60–100% of the copper present in the catalyst is bound to aluminium oxide as copper oxide-aluminium oxide spinel, and wherein the catalyst contains an alkali or alkaline earth oxide which is present in pores of the spinel in an amount of 0.2–12% by weight calculated as metal, and wherein the catalyst contains manganese oxide in an amount corresponding to 0–10% by weight of manganese.

2. A catalyst according to claim 1, wherein the catalyst comprises potassium oxide in the pores of the spinel in an amount of 4–8% by weight calculated as potassium metal.

3. A catalyst according to claim 2, wherein the pores of the spinel contain potassium oxide, and further contain manganese oxide in an amount corresponding to 5% manganese metal.

4. A catalyst according to claim 1, wherein the pores of the spinel contain potassium oxide, and further contain manganese oxide in an amount corresponding to 5% manganese metal.

* * * * *